United States Patent [19]

Fukui et al.

[11] 4,134,056
[45] Jan. 9, 1979

[54] APPARATUS FOR CHARGING RECHARGEABLE BATTERY

[75] Inventors: Katsuo Fukui; Tomio Inoue, both of Sumoto, Japan

[73] Assignee: Sanyo Electric Co., Ltd., Moriguchi, Japan

[21] Appl. No.: 755,823

[22] Filed: Jan. 5, 1977

[30] Foreign Application Priority Data

Jun. 16, 1976 [JP] Japan .................................. 51/71631
Jul. 10, 1976 [JP] Japan .................................. 51/83277

[51] Int. Cl.² .............................................. H02J 7/04
[52] U.S. Cl. ....................................... 320/20; 320/35; 320/39
[58] Field of Search ...................... 320/20, 35, 36, 39, 320/40

[56] References Cited

U.S. PATENT DOCUMENTS

| | | | |
|---|---|---|---|
| 3,852,652 | 12/1974 | Jasinski | 320/35 |
| 3,886,428 | 5/1975 | Macharg | 320/39 |
| 3,911,349 | 10/1975 | Seeley et al. | 320/39 X |
| 3,938,021 | 2/1976 | Kosmin | 320/40 |
| 4,034,279 | 7/1977 | Nilsson | 320/39 X |

FOREIGN PATENT DOCUMENTS 2128093 10/1972 France.
2130700 11/1972 France.
1097451 1/1968 United Kingdom.

*Primary Examiner*—Robert J. Hickey
*Attorney, Agent, or Firm*—Darby & Darby

[57] ABSTRACT

An apparatus for charging a rechargeable battery adapted to be responsive to a charge state of the battery to stop charging the battery, wherein said battery is connected to a direct current voltage source through a switching transistor, which is connected to be responsive to a level detected output of a level detector for level detecting a differentiated output of a differentiation circuit coupled to said battery at a predetermined threshold voltage level of said differentiated voltage output which is selected such that the level detected output is obtained if and when said battery has just been fully charged, whereby said switching transistor is controlled to be non-conductive or less conductive to terminate a charging current supplied to said battery.

20 Claims, 14 Drawing Figures

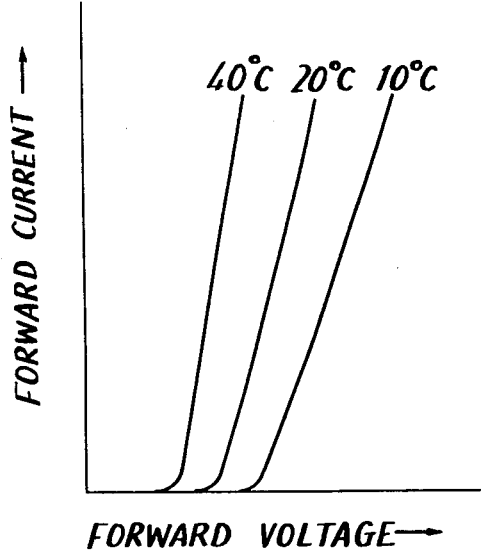
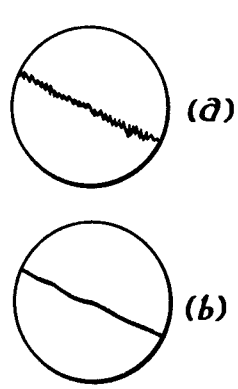
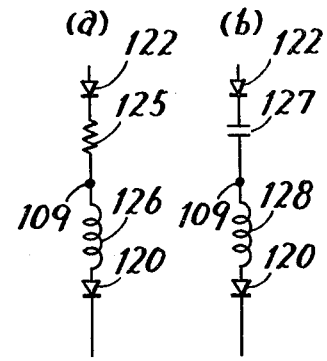
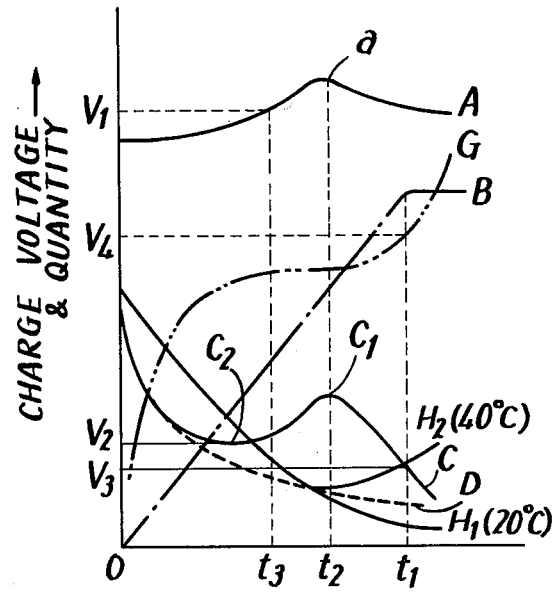
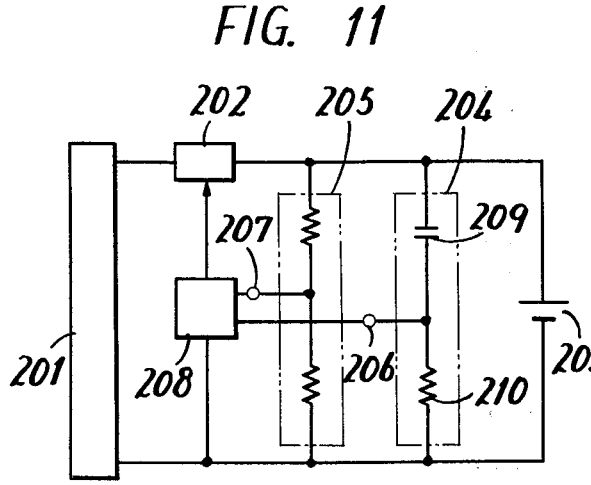
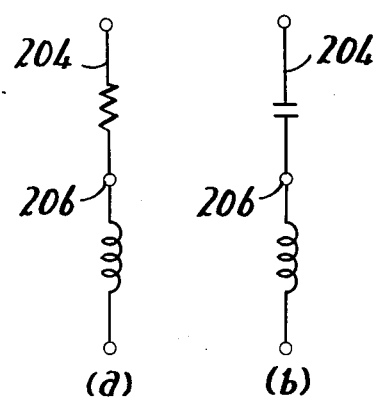

APPARATUS FOR CHARGING RECHARGEABLE BATTERY

BACKGROUND OF THE INVENTION

1. Field of the Invention

The present invention relates to an apparatus for charging a rechargeable battery. More specifically, the present invention relates to an improvement in an apparatus for charging a gas tight sealed rechageable battery which is adapted to be responsive to a charged state of the battery to stop charging the battery.

2. Description of the Prior Art

A typical prior art apparatus for charging a gas tight sealed rechargeable battery which is adapted to be responsive to a charged state of the battery to stop automatically the charging of the battery comprises a potential divider connected in parallel with the battery for the purpose of detecting the terminal voltage of the battery and a threshold detector for detecting a predetermined threshold level selected to be representative of a charged state of the battery, and a control circuit responsive to the threshold detected output for terminating a charging current or changing a charging current from a rapid charge mode to a trickle charge mode.

A problem encountered in such a prior art battery charging apparatus is that the above described threshold level to be selected to be representative of a charged state of the battery is not necessarily associated with the state in which the battery has been fully charged. This will be described in more detail with reference to FIG. 2, which shows a charge voltage characteristic (A) and a charge quantity characteristic (B) and also shows a voltage characteristic (C) of a charged state detecting voltage developed in accordance with the present invention, as to be more fully described subsequently. It is pointed out that FIG. 2 shows such characteristics obtained with an alkalin battery, such as a nickel-cadmium battery. Referring to FIG. 2 and particularly to the characteristic curves A and B, a time point t1 when a charge quantity characteristic B becomes saturated comes after a time point t2 when a charge voltage characteristic A passes a peak point a on the characteristic curve A. In view of the fact that the charge voltage characteristic curve A shows a rise slope before the peak point a whereas the curve A shows a fall slope after the peak point a, a typical prior art automatic battery charging apparatus has been adapted to detect a predetermined threshold voltage level V1 which is selected at a rise slope portion of a larger gradient of the characteristic curve A. As readily seen from the FIG. 2 illustration, a time point t3 when such a predetermined threshold voltage level V1 is detected comes before the time point t2 when the characterisitic curve A reaches the peak point a. As readily understood from comparison of both curves A and B with the timing relation of the time points t1, t2 and t3, such a prior art automatic battery charging apparatus is disadvantageous in that a charged state of the battery is detected when the charge quantity characteristic has reached a value much lower than the saturated value of the charge quantity.

An approach has also been proposed in which a timer is adapted to be responsive to the threshold detected output obtained at the time point t3 corresponding to the predetermined threshold voltage level V1 which timer is structured to determine a time period t3–t2 so that a timer output is obtained at the time point t2 corresponding to the peak of the charge voltage characteristic where threshold voltage level detection is extremely difficult, thereby to stop the charging operation at a state in which the charge quantity characteristic has reached a larger value or the battery has been much more charged. However, this approach requires a timing mechanism or a timing circuit which makes the apparatus expensive in cost. Another disadvantage in this approach is that in view of diversified characteristics of the batteries per se consideration should be given so as to stop charging the battery at a lower average charge quantity value in order to avoid overcharging in some batteries which are likely to be charged more rapidly than others. Hence, as an average, it is difficult to charge the batteries of such diversified characteristics such that each battery is charged individually as fully as possible. Another reason why a time period achieved by a timer cannot be selected to be longer is that if a battery of a relatively large remaining quantity of electricity is charged for such a time period determined by a timer it could happen that the battery is overly charged.

Another problem encountered with a conventional automatic battery charging apparatus is that since a non-active battery is likely to show a higher charge voltage characteristic at an earlier stage in the charging operation of the battery such a type of battery is difficult to be charged with a conventional apparatus. A non-active battery may be defined as a battery which is apparently difficult tentatively to be charged, a battery which is apparently lower tentatively in charge efficiency, a battery which does not tentatively give rise to a chemical reaction, and so on.

SUMMARY OF THE INVENTION

Briefly stated, the present invention comprises an apparatus for charging a rechargeable battery adapted to be responsive to a charged state of the battery to stop charging the battery, comprising: direct current voltage source means for supplying a direct current voltage output to said battery for charging said battery; means operatively coupled to said battery for differentiating the terminal voltage of said battery; means connected between said direct current voltage source means and said battery and responsive to a differentiated voltage output of said differentiating means for controlling a current supplied from said direct current voltage source means to said battery for stopping charging said battery. Preferably, the said control means may comprise variable impedance means connected between said direct current voltage source means and said battery and responsive to a control signal for exhibiting a larger impedance value, and a level detecting means coupled to said differentiating means for level detecting the differentiated voltage output at a predetermined level for detecting a charged state of said battery for providing a control signal to said variable impedance means. In general, the characteristic of the differentiated voltage output obtainable from the differentiation circuit shows a curve of a decreasing tendency as a function of the time in which a bottom peak first appears which is followed by a top peak until the battery is fully charged. Hence the above described predetermined threshold level is selected to be smaller than the bottom peak of the differentiation voltage characteristic.

Therefore, a principal object of the present invention is to provide an improved apparatus for charging a rechargeable battery which is adapted to be responsive to a fully charged state of the battery to stop charging the battery, without overly charging the battery.

Another object of the present invention is to provide an improved apparatus for charging a rechargeable battery which is adapted to be responsive to a fully charged state of the battery to stop charging the battery, without employment of any timing means.

A further object of the present invention is to provide an improved apparatus for charging a rechargeable battery which is adaptably responsive to a fully charged state of the batteries of diversified charge voltage characteristics to stop charging the battery, without overly charging the battery.

Still a further object of the present invention is to provide an improved apparatus for charging a rechargeable battery wherein a non-active battery may be charged to a fully charged state.

Still another object of the present invention is to provide an improved apparatus for charging a rechargeable battery which is adapted to be responsive to a charged state of the battery to stop charging the battery, without being adversely affected by variation of an ambient temperature.

According to another aspect of the present invention, potential dividing means is further coupled to the battery for dividing the terminal voltage of said battery, and the said control means comprises variable impedance means connected between said direct current voltage source means and said battery and responsive to a control signal for exhibiting a larger impedance value, and means coupled to said differentiating means and potential dividing means for level detecting the difference voltage between the differentiated voltage output and the potential divided output at a predetermined level for detecting a charged state of said battery for providing a control signal to said variable impedance means. According to this aspect of the invention, it has been observed that relatively a large gradient change is likely to occur around the time when the battery has just been fully charged. Hence, accurate detection of a charged state of the battery is possible with an apparatus of a simplified structure, as compared with a prior art apparatus.

According to a further aspect of the present invention, means is further coupled between said differentiating means and said control means for rectifying the differentiated voltage output, whereby more accurate detection of a charged state of the battery is assured.

According to still a further aspect of the present inveniton, means is further provided in said differentiating means for level shifting the differentiated voltage output therefrom, thereby to assure that more accurate detection of a charged state of the battery is achieved.

These objects, other objects, aspects, features and advantages of the present invention will become more apparent from the following detailed description of the preferred embodiment of the present invention made with reference to the accompanying drawings.

BRIEF DESCRIPTION OF THE DRAWINGS

FIG. 8 is a graph showing a temperature characteristic of the diode 120 in the FIG. 6 embodiment, wherein various rectifying characteristics are shown with various temperatures as a parameter;

FIGS. 9 (a) and (b) are an enlarged partial view of the differentiation voltage characteristic curve in the encircled portion in FIG. 7 and a graph similar to that in FIG. 9 (a) showing the differentiated voltage characteristic in case where the diode 111 is inserted, respectively;

FIG. 10 shows alternative embodiments of the differentiation circuit 107 in the FIG. 6 embodiment;

FIG. 11 is a block diagram showing the principle of a modification of the present invention;

FIG. 12 shows alternative embodiment of the differentiation circuit 204 in the FIG. 11 embodiment;

FIG. 13 shows a graph similar to the FIG. 2 graph but further showing the characteristic of the voltage difference between the differentiated voltage characteristic and the potential divided voltage characteristic.

DESCRIPTION OF THE PREFERRED EMBODIMENTS

Figure 1:
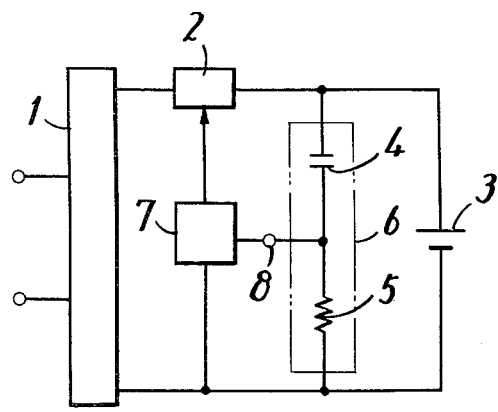
FIG. 1 is a block diagram showing the principle of the present invention.

FIG. 1 is a block diagram showing the principle of the present invention, which comprises a direct current power supply 1 for providing a constant direct current voltage output by rectifying an alternating current from the commercial power source by the use of a transformer and a full wave rectifying circuit, and a switch circuit 2, which are connected in series with a rechargeable battery 3 to be charged. The inventive apparatus shown further comprises a differentiation circuit 6 implemented by a series connection of a capacitor 4 and a resistor 5, which is connected in parallel with the battery 3, and a threshold level detector 7 for detecting a charged state of the battery coupled to be responsive to the voltage across the resistor 5 for level detecting the voltage at a predetermined threshold level thereof to control the switch circuit 2 to be turned off or to be less conductive.

Figure 2:
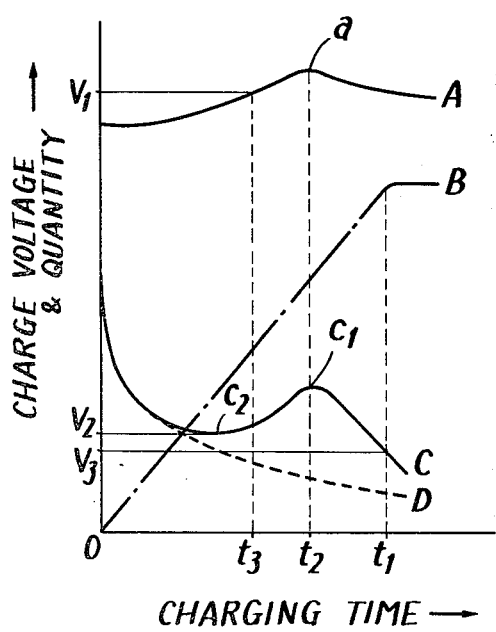
FIG. 2 shows a graph of battery charge voltage and quantity characteristics of the battery as curves A and B, respectively.

Referring to FIG. 2 which shows a graph of battery charge voltage and quantity characteristics of the battery as curves A and B, respectively, the curve C shows a differentiated voltage characteristic obtainable at the differentiated voltage output terminal 8 of the differentiation circuit 6 of the FIG. 1 embodiment. It is observed that the characteristic curve C comprises a peak point c1 and a bottom point c2, as quite different from an ordinary differentiation characteristic of the differentiation circuit 6 per se, as shown as D. It is further observed that the peak point c1 of the voltage characteristic curve C corresponds to the peak point a of the battery charge voltage characteristic A in terms of the timing. Although the reason why the voltage characteristic curve C gives rise to such a peak point c1 is not clear, it is presumed that such a peak c1 is caused because the voltage at the terminal 8 is raised from the characteristic curve D as the voltage across the differentiation circuit 6 increases together with an increase in the terminal voltage of the battery in accordance with the characteristic curve A and in addition the voltage drop across the resistor 5 also increases because of an increase in a current flowing into the differentiation circuit 6.

In accordance with the present invention, the threshold voltage level of the characteristic curve C to be level detected by means of the above described detecting circuit 7 is selected to be a voltage $V_3$ lower than a voltage value $V_2$ at the above described bottom point c2 and the switch circuit 2 is adapted to be responsive to the level detected output from the detecting circuit 7 to be turned off or to be less conductive, thereby to stop charging the battery 3.

Figure 3:
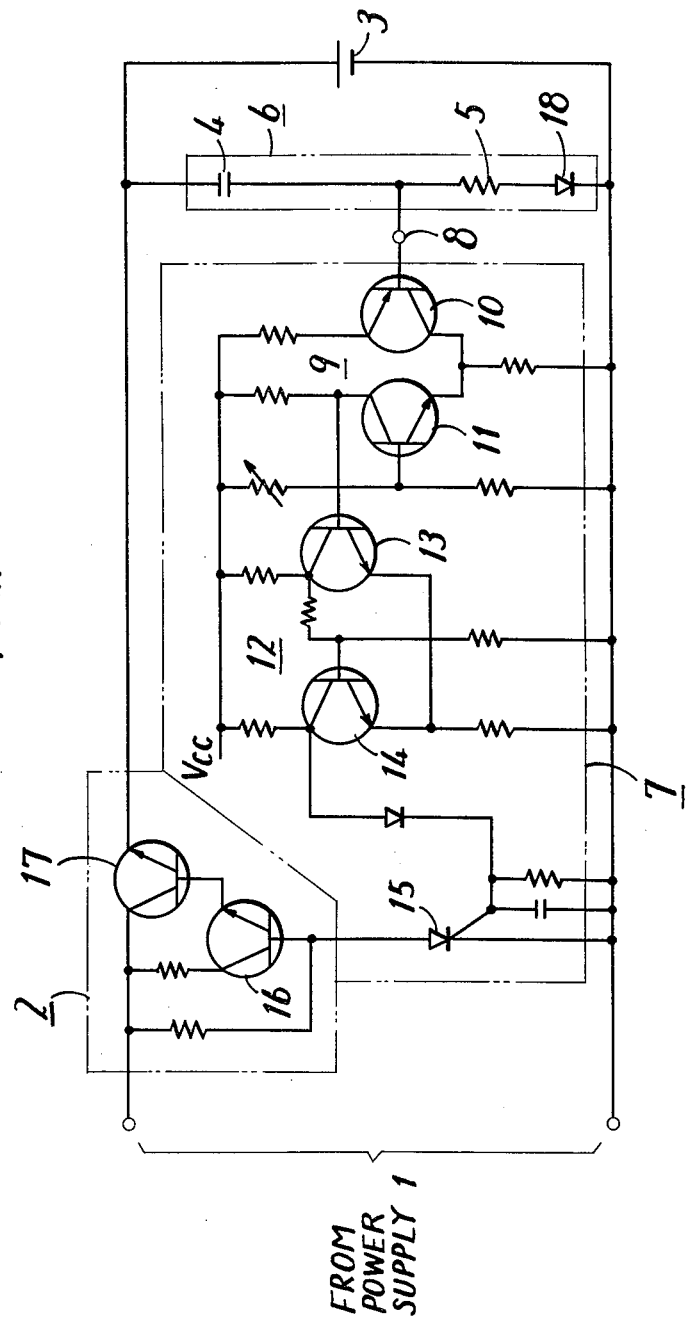
FIG. 3 shows a schematic diagram of one embodiment of the present invention.

FIG. 3 shows a shematic diagram of one embodiment of the present invention. Referring to FIG. 3, the differentiation circuit 6 is implemented by a capacitor 4, a resistor 5 and a diode 18 for shifting the voltage level, connected in series. The detecting circuit 7 comprises a differential amplifier 9, a Schmitt circuit 12 and a silicon controlled rectifier 15. The differential amplifier 9 is implemented by a pair of transistors 10 and 11. The Schmitt circuit is implemented by transistors 13 and 14. The switch circuit 2 is implemented by direct connected transistors 16 and 17.

In operation, the first transistor 10 of the differential amplifier 9 serves to detect the above described predetermined voltage level $V_3$ to be turned on and accordingly the second transistor 11 is turned off. Accordingly, the collector potential of the second transistor 11 increases to turn on the preceding stage transistor 13 of the Schmitt circuit 12, which makes the subsequent stage transistor 14 be turned off. Accordingly the collector potential of the transistor 14 increases to make the silicon controlled rectifier 15 conductive, which makes lower the base potential of the transistors 16 and 17 constituting the switch circuit 2, thereby to turn off the switch circuit 2. The diode 18 is connected in series with the capacitor 4 and the resistor 5 constituting the differentiation circuit 6, such that the voltage across the series connection of the resistor 5 and the diode 18 can be detected. The diode 18 serves to shift the voltage detection level at the terminal 8 of the differentiation circuit 6 without degrading the characteristic curve C, thereby to facilitate threshold level detection by means of the level detecting circuit 7.

Figure 4:
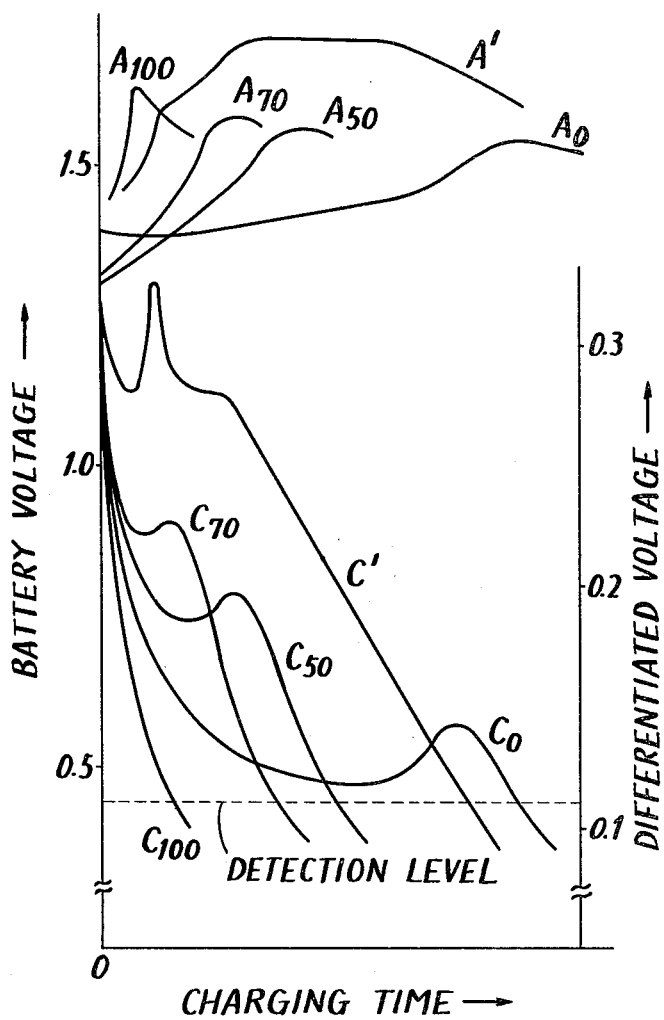
FIG. 4 shows various pairs of the battery charge voltage characteristic curves and the differentiation voltage characteristic curves, with the remaining quantity of electricity in the battery as a parameter.

FIG. 4 shows various pairs of the battery charge voltage characteristic curves A0, A50, A70 and A100 and the differentiation voltage characteristic curves C0, C50, C70, and C100, respectively, with the remaining quantity of the electricity in the battery as a parameter, wherein the subscript numerals of the respective characteristic curves indicate the remaining quantity of electricity in terms of percentage from the empty state as "0" to the full state as "100". In FIG. 4, the characteristic curve A' shows a charge voltage characteristic of a non-active battery and the differentiation voltage characteristic curve C' shows a differentiation voltage characteristic of the same non-active battery. In case of the battery of the characteristic curves shown in FIG. 4, the minimum voltage level reached by the differentiation voltage characteristic curve C0 at the bottom point was 0.115V. Hence, in the embodiment shown, the threshold voltage level to be level detected was selected to be 0.11V.

Figure 5:
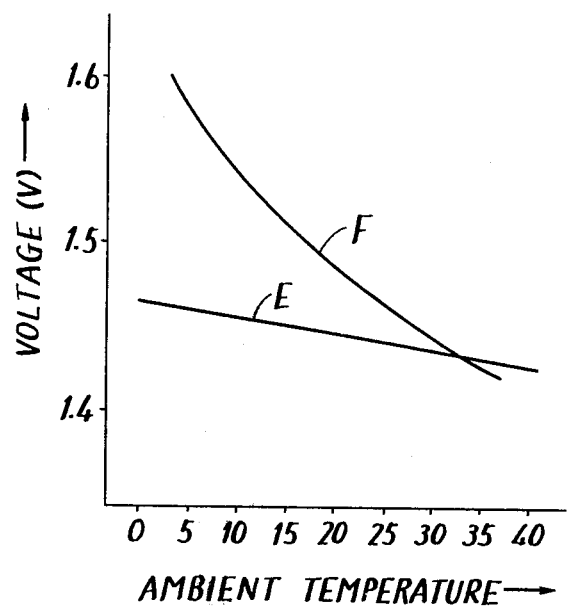
FIG. 5 shows a temperature characteristic curve E of the detected differentiated voltage at the terminal of the differentiation circuit in comparison with a similar temperature characteristic curve F obtained at a potential divider connected in parallel with the battery in accordance with the prior art approach.

FIG. 5 shows a temperature characteristic curve E of the detected differentiation voltage at the terminal 8 in comparison with a similar temeperature characteristic curve F obtained at a potential divider connected in parallel with the battery in accordance with the prior art approach. From the FIG. 5 illustration it is observed that the inventive apparatus is much less influenced by the variation of the ambient temperature.

Figure 6:
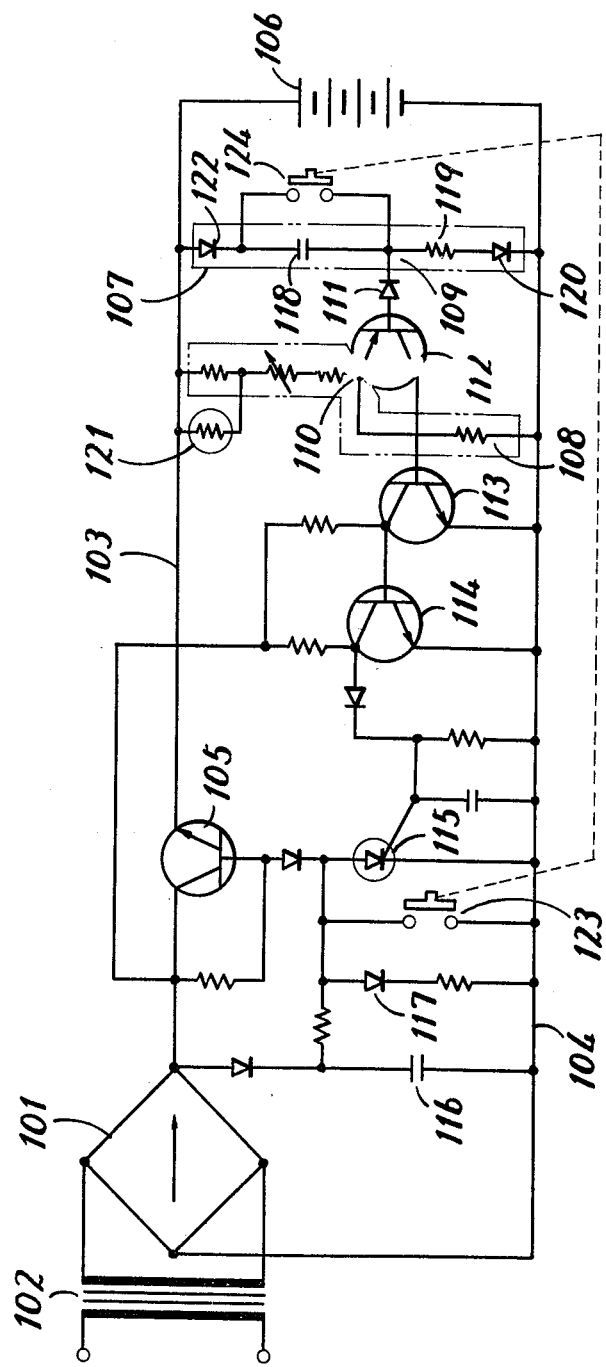
FIG. 6 shows a schematic diagram of another embodiment of the present invention.

FIG. 6 shows a schematic diagram of another embodiment of the present invention. Referring to FIG. 6, the embodiment shown basically comprises a direct current source 101 and a rechargeable battery 106 being charged connected from the direct current source 101 through a switch circuit 105. The direct current source 101 comprises a full wave rectifier, the input of which is connected through a step down transformer 102 to a commercial power supply terminal and the output of which is connected to a positive bus 103 and a negative bus 104 constituting a charge line. The switch circuit 105 comprises a switching transistor inserted in the positive bus 103. The embodiment shown further comprises a differentiation circuit 107 and a potential divider 108, both connected in parallel with the battery 106. A transistor 112 is operatively coupled to the differentiation circuit 107 and the potential divider 108, such that the emitter electrode of the transistor 112 is connected to the intermediate tap 110 of the potential divider 108 and the base electrode of the transistor 112 is connected through a diode 111 to the differentiated output terminal 109 of the differentiation circuit 107. The transistor 112 is of a PNP type and the polarity of the emitter-base junction and the diode junction is selected such that the direction from the intermediate terminal 110 of the potential divider 108 toward the differentiated output terminal 9 of the differentiation circuit 7 is a forward direction. The embodiment shown further comprises an amplifier implemented by direct coupled transistors 113 and 114, which amplifier is connected between the positive and negative busses 103 and 104. The input to the amplifier and thus the input electrode of the preceding stage transistor 113 is coupled to the collector electrode of the transistor 112, so that the transistor 113 becomes conductive responsive to conduction of the transistor 112 and accordingly the succeeding stage transistor 114 becomes operative to the contrary. The input of the switch circuit 105 and thus the base electrode of the transistor 105 is connected to the negative bus 104 through a silicon controlled rectifier 115, the gate electrode of which is operatively coupled to the output of the above described amplifier and thus the collector electrode of the succeeding transistor 114. The anode of the silicon controlled rectifier 115 is coupled to a filter including a capacitor 116, such that the silicon controlled rectifier 115 is kept conductive if it is once controlled to be conductive, thereby to turn off the switching transistor 105 to terminate a charging current supplied from the direct current source 101 to the battery 106. A light emitting diode 117 is coupled in parallel with the silicon controlled rectifier 115, such that the diode 117 is turned off if and when the silicon controlled rectifier 115 is turned on, thereby to display the charging state of the battery 106. Preferably the differentiation circuit 107 may comprise a diode 122 for preventing the capacitor 118 from being discharged. Switches 123 and 124 provided in a gang fashion in parallel with the silicon controlled rectifier 115 and the capacitor 118, respectively, constitutes a start switch. The differentiation circuit 107 basically comprises the capacitor 118 and a resistor 119 connected in series but may further comprise a diode 120 connected in series for the purpose of magnifying the voltage level at the differentiated output terminal 109 by shifting the potential level by the value commensurate with a forward voltage drop across the diode junction of the diode 120. Depression of the start switch makes the switches 123 and 124 closed, thereby to shunt the silicon controlled rectifier 115 to turn it off and also to shunt the capacitor 118 to discharge the same.

Figure 7:
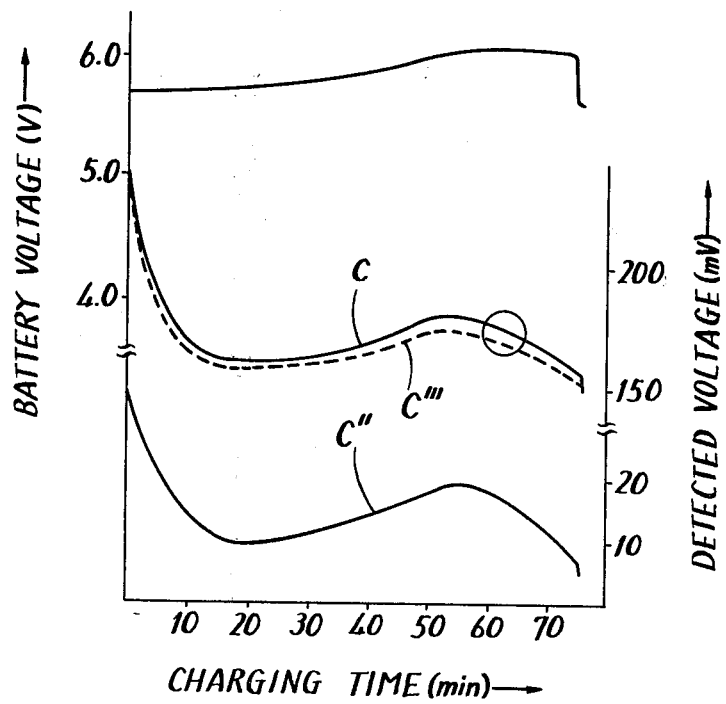
FIG. 7 shows a differentiated voltage characteristic of the FIG. 6 embodiment in comparison with that of the embodiment without a level shifting diode in the differentiation circuit.

As described previously, the diode 120 is aimed to magnify or shift the voltage at the differentiated output terminal 109. Without this diode 120, the differentiated output voltage characteristic is lower, even if the diode is replaced by a resistor. Such comparison is best seen in FIG. 7, which shows a differentiated voltage characteristic of the embodiment shown in comparison with that of the embodiment without such a level shifting diode. More specifically, the curve C shows the differentiated voltage characteristic of the FIG. 6 embodiment, while the curve C" shows the differentiated voltage characteristic of the embodiment without such a level shifting diode. As seen from FIG. 7, it is appreciated that the diode 120 serves to appreciably shift the level of the differentiated voltage characteristic obtainable at the differentiated output terminal 109 of the differentiation circuit 107.

On the other hand, employment of the diode 120 in the differentiation circuit 107 causes a problem in conjunction with a temperature characteristic. FIG. 8 is a graph showing a temperature characteristic of the diode 120, wherein various rectifying characteristics are shown with various temperatures as a parameter. As seen from FIG. 8, as the ambient temperature becomes higher, the rising voltage in the forward rectifying characteristic becomes lower and accordingly the differentiation voltage characteristic becomes lower from the curve C to the curve C", with the result that the transistor 112 is liable to be operative at an earlier time and thus the battery 106 is liable to be less fully charged. Hence, it is desired to compensate for a decrease in the differentiated output voltage obtainable at the terminal 109 by decreasing the voltage obtainable at the intermediate terminal 110 of the potential divider 108 in accordance with the decrease in the output voltage obtainable from the differentiation output terminal 109 due to an increase in the ambient temperature. In order to eliminate such a problem, the embodiment shown comprises a thermal sensitive device 121 of a positive characteristic connected in parallel with a resistor of the potential divider between the intermediate terminal 110 and the positive bus 103, so that the intermediate terminal potential may be lowered as the ambient temperature increases. Alternatively, a thermal sensitive device of a negative characteristic may be used, in which case the negative characteristic device should be coupled in parallel with a resistor portion between the negative bus 104 and the intermediate terminal 110.

It has been observed that the differentiation voltage characteristic curve tends to vary with a ripple like component. FIG. 9 (a) is an enlarged partial view of the differentiation voltage characteristic curve in the encircled portion in FIG. 7. Such a ripple like variation is very likely to cause malfunction by the detecting transistor 112. This problem can be solved by inserting the diode 111 between the intermediate terminal 110 and the differentiated output terminal 109 in series with the base-emitter junction of the detecting transistor 112. FIG. 9 (b) is a graph similar to the graph in FIG. 9 (a), which shows the differentiated voltage characteristic in case where the diode 111 is inserted.

FIG. 10 shows alternative embodiments of the differentiation circuit 107. The FIG. 10 (a) embodiment comprises a series connection of a diode 122, a resistor 125, a coil 126 and a diode 120, with a terminal 109 being a differentiated voltage output. The FIG. 10 (b) embodiment comprises a series connection of a diode 122, a capacitor 127, a coil 128 and a diode 120, with a terminal 109 being a differentiated voltage output.

FIG. 11 is a block diagram showing the principle of a modification of the present invention, which comprises a direct current power supply 201 for providing a constant direct current output, and a switch circuit 202, which are connected in series with a rechargeable battery 203 to be charged. The modification shown further comprises a differentiation circuit 204, a potential divider 205, both connected in parallel with the rechargeable battery 203, and a threshold level detector 208 coupled to the differentiated output terminal 206 of the differentiation circuit 204 and the potential divided output terminal 207 of the potential divider 205 for level detecting the difference potential between the differentiated voltage and the potential divided voltage at a predetermined threshold level thereof to control the switch circuit 202 to be turned off or to be less conductive, thereby to terminate a rapid charging current.

The differentiation circuit 204 is implemented by a combination of two different devices among a resistor, a coil and a capacitor. The FIG. 11 embodiment is shown as comprising the differentiation circuit 204 implemented by a capacitor 29 and a resistor 210. FIG. 12 shows modifications of the differentiation circuit, in which FIG. 12 (a) is a combination of a resistor and a coil, whereas FIG. 12 (b) is a combination of a capacitor and a coil, with a terminal 206 being a differentiated voltage output.

FIG. 13 shows a graph similar to the FIG. 2 graph, wherein the differentiated voltage characteristic of the differentiation circuit 204 is shown as a curve C, which comprises a peak point C1 and a bottom point C2, as fully described with reference to the FIG. 2 graph. As previously described with reference to FIG. 2, a charge voltage characteristic is shown as a curve A, a charge quantity characteristic is shown as a curve B, and an ordinary differentiation characteristic of the differentiation circuit 204 per se is shown as a curve D.

The potential divider 205 may comprise a series connection of a plurality of resistors and the potential divided voltage obtainable at the intermediate terminal 207 is directly proportional to the terminal voltage, shown as the curve A, of the battery 203. Accordingly, the difference voltage characteristic between the differentiated output voltage obtainable at the terminal 206 of the differentiation circuit 204 and the potential divided voltage obtainable at the intermediate terminal 207 of the potential divider 205 may be shown as curve G in FIG. 13. As seen from FIG. 13, the difference voltage characteristic curve G shows a rapid rise slope and thus a large gradient around the time t1 when the battery has just been fully charged. Hence it is appreciated that the above described difference voltage characteristic curve is most suited for detection of a charged state of the battery. In the embodiment shown, a threshold voltage level to be detected by the level detector 208 is selected to be the value V4, which corresponds to a time point t1, such that the switch circuit 202 is controlled to be turned off or to be less conductive responsive to the level detected output from the level detector 208, thereby to terminate a charging current to be supplied to the battery 203.

Figure 14:
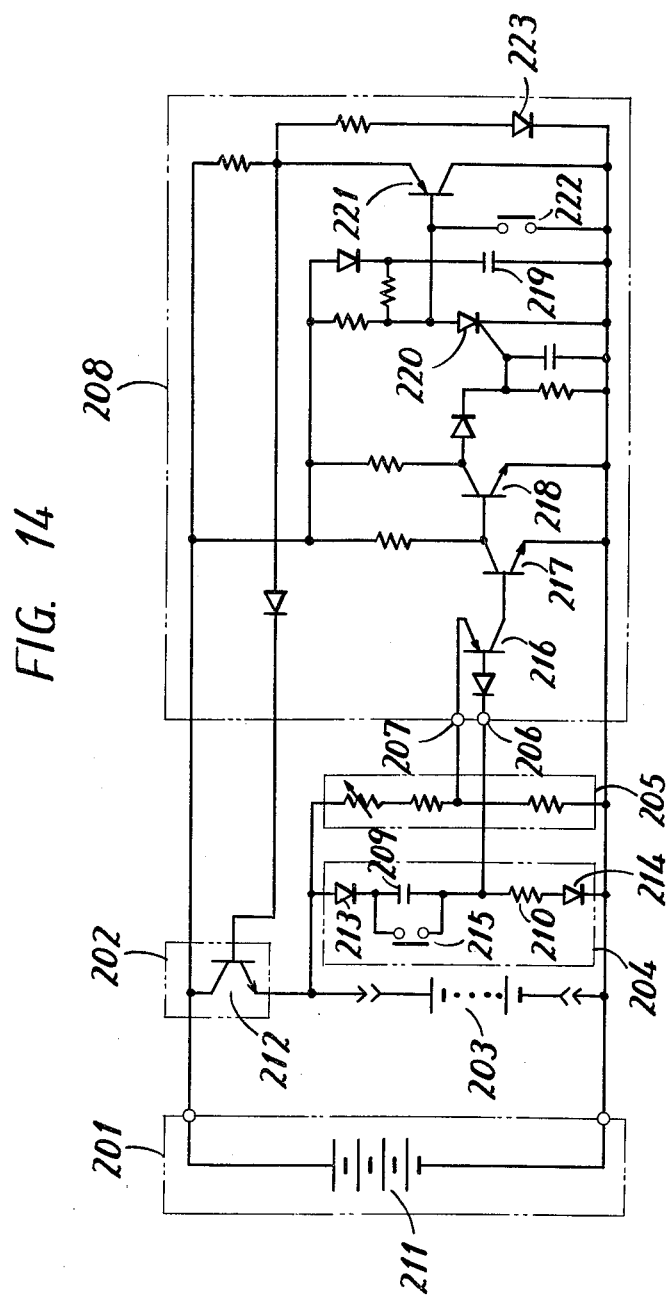
FIG. 14 shows a schematic diagram of an embodiment employing the principle shown in FIG. 11.

FIG. 14 shows a schematic diagram of an embodiment employing the principle shown in FIG. 11. Referring to FIG. 14, the direct current power supply 201 of the embodiment shown comprises a lead storage battery 211 in order to charge the rechargeable battery 203 comprising a nickel cadmium battery. The switch circuit 202 is implemented by a transistor 212. The differentiation circuit 204 basically comprises a capacitor 209 and a resistor 210 connected in series and additionally comprises a diode 213 for preventing the capacitor 209 from being discharged in the reverse direction an a diode 214 for level shifting the voltage obtainable at the output terminal 206. A start switch 215 is provided to shunt the capacitor 209. The start switch 215 is tentatively closed to discharge the capacitor 209, thereby to return to an initial state, when the charging operation of the apparatus is started. The detecting circuit 208 comprises a first transistor 216 for level detecting the reference voltage between the output terminal 206 and the intermediate terminal 207 at a predetermined threshold level as at V4 in FIG. 13, a second transistor 217 which is responsive to the conduction of the first transistor 216 to be conductive, a third transistor 218 which is responsive to the conduction of the second transistor 217 to be non-conductive, a silicon controlled rectifier 220 connected such that the gate electrode thereof is responsive to the increase in the collector voltage when the transistor 218 becomes non-conductive and accordingly the silicon controlled rectifier 220 is turned on, and a fourth transistor 221 which is responsive to the conduction of the silicon controlled rectifier 220 to be conductive, thereby to turn off the switch transistor 212 of the switch circuit 202. The silicon controlled rectifier 220 is shunted through a resistor by a capacitor 219 to keep the silicon controlled rectifier 220 conductive. A turn off switch 222 is provided in a gang fashion with the above described start switch 215 so as to shunt the silicon controlled rectifier 220, so that the turn off switch 222 is also closed as the start switch 215 is closed, thereby to return the apparatus to an initial state. Preferably a light emitting diode 223 is connected between the emitter and the collector of the fourth transistor 221 for the purpose of displaying the charging state of the battery 203.

The operation of the FIG. 14 embodiment is substantially the same as that of the FIG. 11 diagram and hence will be apparent to those skilled in the art. Since the FIG. 14 embodiment employs a storage battery as the direct current power supply 201, it follows that the battery 203 is charged with an approximate constant voltage source the charging current of which gradually decreases as the charging time proceeds, i.e. in accordance with a constant voltage charging system.

Referring again to FIG. 13, it is pointed out that FIG. 13 also includes a charging current characteristic with various temperatures as a parameter. More specifically, the curve H1 shows a charging current characteristic at 20° C. and the curve H2 shows a charging current characteristic at 40° C. As seen from these curves, a charging current characteristic at a higher temperature shows a falling slope until the time point t2 and a rising slope thereafter, with the result that a bottom peak appears around the time point t2. Thus, it is appreciated that if detection of a charged state of the battery had been done by level detecting a charging current characteristic, then it could have happened that the battery is overly charged particularly at a higher temperature. Since according to the present invention a charged state is detected by level detecting a differentiated voltage characteristic rather than level detecting a charging current characteristic, the battery is not overly charged even if a constant voltage charging system is employed.

Although this invention has been described and illustrated in detail, it is to be clearly understood that the same is by way of illustration and example only and is not to be taken by way of limitation, the spirit and scope of this invention being limited only by the terms of the appended claims.

What is claimed is:

1. An apparatus for charging a rechargeable battery adapted to be responsive to a charged state of the battery to stop charging the battery, comprising:
   direct current voltage source means for supplying a direct current voltage output to said battery for charging said battery,
   means operatively coupled to said battery for diferentiating the terminal voltage of said battery to produce a differentiated voltage output having a characteristic which decreases as a function of time as the battery is charged in which there is a bottom peak followed by a top peak until the battery is fully charged,
   means including variable impedance means connected between said direct current voltage source means and said battery and responsive to a differentiated voltage output of said differentiating means of a value less than that of the bottom peak for controlling a charging current to be supplied from said direct current voltage source means to said battery, and
   level detecting means coupled to said differentiating means for level detecting the differentiated voltage output at a predetermined level for detecting a charged state of said battery and providing a control signal to said controlling means to change the impedance of said variable impedance means to stop the charging of said battery.

2. An apparatus for charging a rechargeable battery in accordance with claim 1, wherein said variable impedance means comprises switching means responsive to said control signal to be non-conductive.

3. An apparatus for charging a rechargeable battery in accordance with claim 1, wherein said variable impedance means comprises switching means responsive to said control signal to be less conductive.

4. An apparatus for charging a rechargeable battery in accordance with claim 1, wherein said differentiating means comprises means for level shifting said differentiated voltage output.

5. An apparatus for charging a rechargeable battery in accordance with claim 4, wherein said level shifting means comprises a diode.

6. An apparatus for charging a rechargeable battery in accordance with claim 1, wherein said differentiating means comprises a combination of reactance means and resistor means.

7. An apparatus for charging a rechargeable battery in accordance with claim 1, which further comprises means for returning said apparatus to an initial condition.

8. An apparatus for charging a rechargeable battery in accordance with claim 6, which further comprises means for returning said differentiating means to an initial condition.

9. An apparatus for charging a rechargeable battery in accordance with claim 1, which further comprises means coupled between said differentiating means and said controlling means for rectifying the differentiated voltage output.

10. An apparatus for charging a rechargeable battery in accordance with claim 1, which further comprises
   potential dividing means coupled to said battery for dividing the terminal voltage of said battery, and
   said level detecting means being coupled to said differentiating means and said potential dividing means for level detecting the difference voltage between said differentiated voltage output and said divided voltage output and at said predetermined level of said differentiated voltage output detecting from the difference voltage the charged state of said battery and providing said control signal to said controlling means.

11. An apparatus for charging a rechargeable battery in accordance with claim 1, which further comprises means operatively coupled to said differentiating means for compensating a variation of said differentiated voltage output caused by a variation of an ambient temperature.

12. An apparatus for charging a rechargeable battery adapted to be responsive to a charged state of the battery to stop charging the battery, comprising:
   direct current voltage source means for supplying a direct current voltage output to said battery for charging said battery,
   means operatively coupled to said battery for differentiating the terminal voltage of said battery,
   means coupled to said battery for sensing its terminal voltage,
   means including variable impedance means connected between said direct current voltage source means and said battery and responsive to a differentiated voltage output of said differentiating means for controlling a charging current to be supplied from said direct current voltage source means to said battery, and
   level detecting means coupled to said differentiating means and said battery terminal voltage sensing means for level detecting the difference between the differentiated voltage output and only the sensed battery terminal voltage and at a predetermined level of the difference of the two voltages detecting a charged state of said battery and providing a control signal to said controlling means to change the impedance of said variable impedance means to stop the charging of said battery.

13. An apparatus for charging a rechargeable battery in accordance with claim 12, wherein said variable impedance means comprises switching means responsive to said control signal to be non-conductive.

14. An apparatus for charging a rechargeable battery in accordance with claim 12, wherein said variable impedance means comprises switching means responsive to said control signal to be less conductive.

15. An apparatus for charging a rechargeable battery in accordance with claim 12, which further comprises means coupled between said differentiating means and said controlling means for rectifying the differentiated voltage output.

16. Apparatus for charging a rechargeable battery as in claim 12 wherein the differentiating means produces a differentiated voltage output having a characteristic which decreases as a function of time as the battery is charged in which there is a bottom peak followed by a top peak.

17. An apparatus for charging a rechargeable battery in accordance with claim 12 wherein said means for sensing the battery terminal voltage further comprises potential dividing means for producing a reduced amplitude version of the battery terminal voltage.

18. An apparatus for charging a rechargeable battery in accordance with claim 17, wherein said level detecting means comprises a transistor having one electrode connected to said differentiating means and the other electrode connected to said potential dividing means.

19. An apparatus for charging a rechargeable battery as in claim 12 wherein said differentiating means includes means for level shifting the differentiated voltage output.

20. An apparatus for charging a rechargeable battery in accordance with claim 19, wherein said level shifting means comprises a diode.

* * * * *